United States Patent [19]
Bergeron

[11] 3,807,548
[45] Apr. 30, 1974

[54] CONVEYOR LINK AND CONVEYOR CHAINS MADE THEREFROM

[75] Inventor: Maurice Bergeron, La Celle Saint-Cloud, France

[73] Assignee: Compagnie Europrenne de Manutention, Paris, France

[22] Filed: Nov. 15, 1972

[21] Appl. No.: 306,532

[52] U.S. Cl. ............................................. 198/195
[51] Int. Cl............................................ B65g 15/30
[58] Field of Search ............ 198/189, 195, 196, 197

[56] References Cited
UNITED STATES PATENTS
3,513,965   5/1970   Miller ................................. 198/195

Primary Examiner—Richard E. Aegerter

[57] ABSTRACT

A conveyor link and conveyor comprising substantially the shape of a plate formed with a pair of curved lug projecting from one edge under the plate and with a pair of closed-loop forming straps along the other edge, so that relative engagement of the lugs and straps permits the easy assembling and disassembling of the links. The shape of the plate is such as to permit a lateral swivel movement of the adjacent links in a chain constructed by using these links.

7 Claims, 8 Drawing Figures

CONVEYOR LINK AND CONVEYOR CHAINS MADE THEREFROM

BACKGROUND OF THE INVENTION

1. Field of the Invention

The present invention relates to the conveyor chains of certain types of conveyors, and more particularly those comprising a series of links hingedly interconnected, each link being substantially of plate configuration so as to provide a bearing or carrier surface.

2. Description of the Prior Art

In many known constructions of this character the links comprise means permitting of rapidly assembling and disassembling these links with one another without using special tools, for example when some of them have to be cleaned or replaced. However, these assembling means should also permit the pivotal coupling of the links with one another so that the conveyor chain thus obtained can travel along a path comprising sections disposed in different planes.

Now the links proposed heretofore are attended by various invonveniences. Firstly, the design of their interconnecting or coupling portions or means is such that relatively complicated operations are necessary for assembling and disassembling these links. Further, these assembling means are not sufficiently sturdy. Finally, their shape is such that they cannot be manufactured under optimum production conditions on a commercial basis, that is, by forming a one-pice casting with the plate constituting the main body of the link.

SUMMARY OF THE INVENTION

It is therefore the essential object of the present invention to provide an improved link of the type broadly set forth hereinabove, which is designed with a view to remove these various inconveniences.

To this end, the assembling means provided on this link comprise:

on the one hand, a pair of curved or bent coupling lugs projecting beyond one of the edges of the corresponding plate, parallel to the longitudinal axis of the conveyor band to be obtained, and on the other hand, a pair of closed-loop forming straps disposed transversely on the underface of the same plate, adjacent its opposite edge, said straps being adapted to be engaged by the coupling lugs of another identical link.

On the other hand, the bridge or central portion of each strap has an at least partially cylindrical configuration of the same radius as the coupling lugs in order to permit the easy pivotal assembling of two adjacent links with each other.

With this arrangement, the links according to the present invention can be assembled very easily and rapidly. Likewise, these links can be disassembled quite readily, since it is only necessary to cause two adjacent links to pivot in relation to each other for releasing the coupling lugs of one link from the straps of the other link.

Other features and advantages of this invention will appear as the following description proceeds with reference to the attached drawings given by way of illustration and wherein:

DESCRIPTION OF THE PREFERRED EMBODIMENT

In the form of embodiment illustrated in the drawings, each link comprises a plate 1 advantageously comprising molded plastic material of adequate composition.

The upper face 2 of this plate is adapted to act as a carrier surface by constituting one of the elements of the conveyor band or chain to be constructed from the links of this invention.

This plate is adapted to be assembled with a number of other identical plates 1a, 1b, 1c, 1d . . . However, the leading and trailing edges of these plates are to designed that any pair of adjacent or successive links can partially overlap each other, as clearly illustrated in the drawings. To this end, each plate is divided into two portions designated by the reference numerals 3 and 4, respectively, disposed in two different but parallel planes, the difference in level between these two planes corresponding to the plate thickness. Thus, the front portion 3 of link 1a can overlap the rear portion 4 of the preceding link 1, while being level with the same upper plane as the front portion 3 of this link 1.

Figure 1:
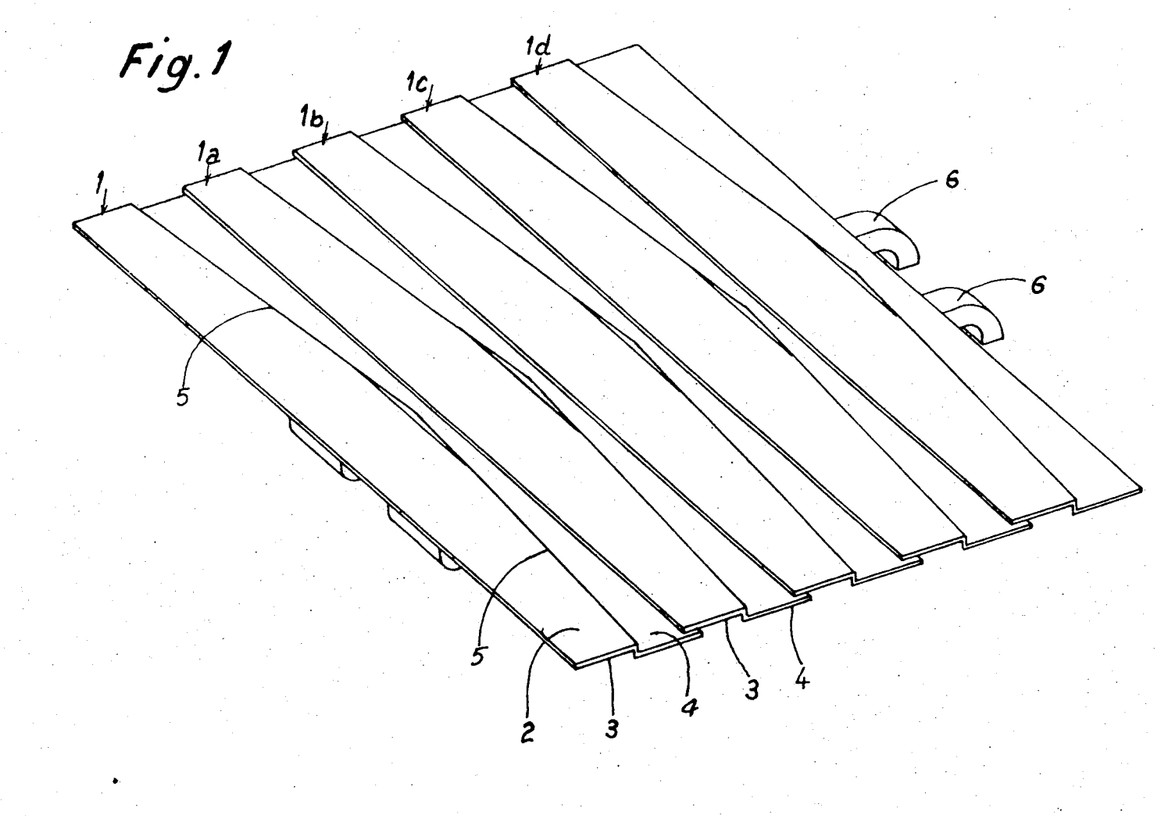
FIG. 1 is a perspective view of the upper faces of a plurality of links assembled in proper alignment and in the position normally obtaining when the conveyor band has a rectilinear shape.
Figure 2:
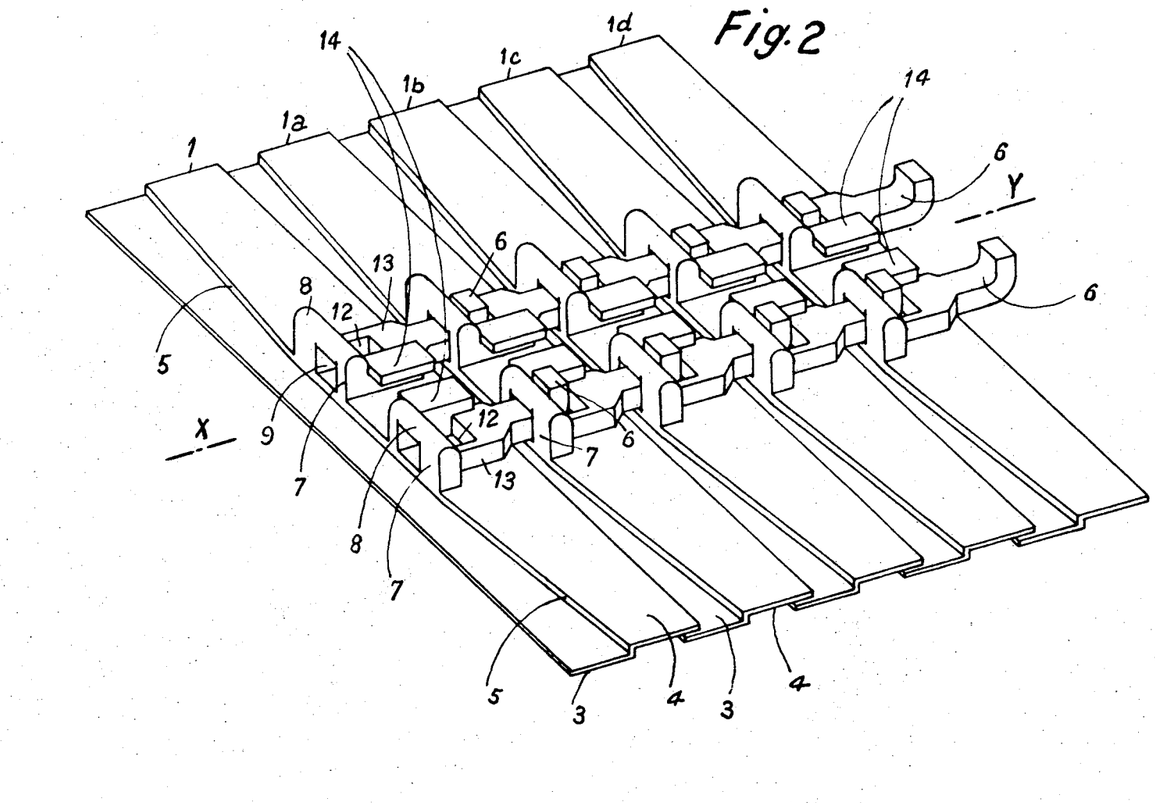
FIG. 2 is a corresponding perspective view of the lower faces of the same series of links.
Figure 3:
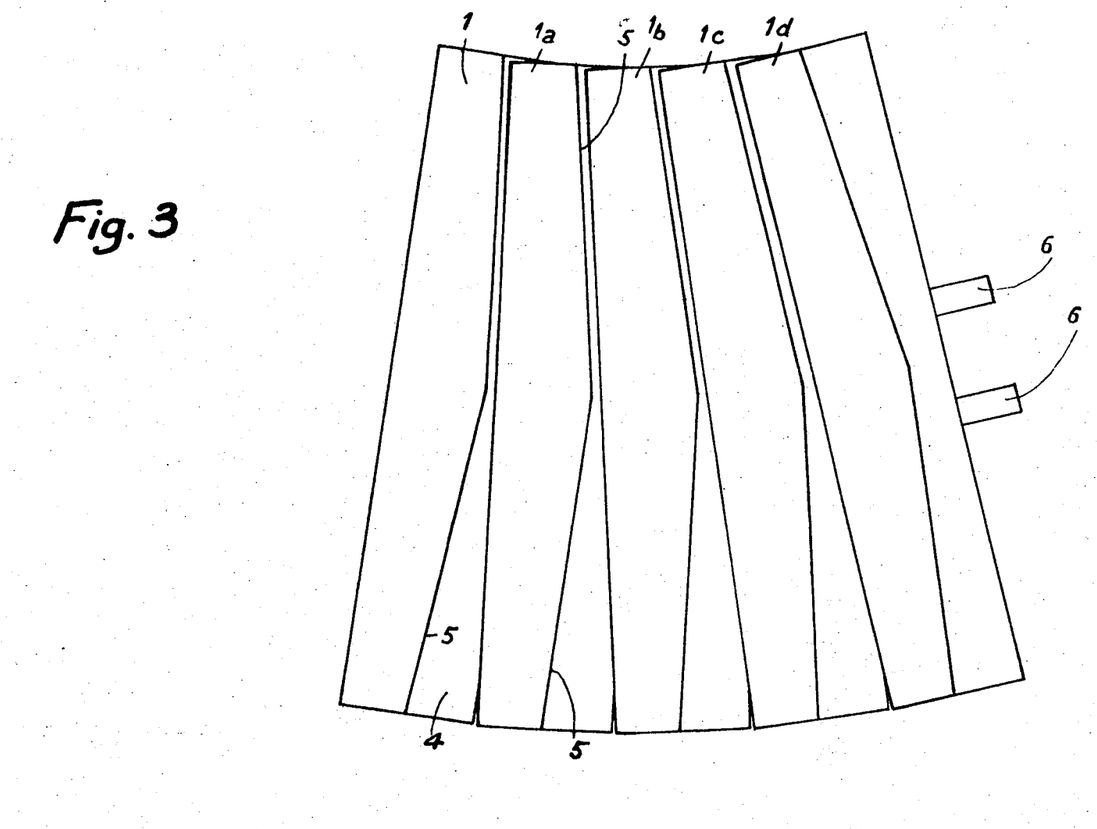
FIG. 3 is a plan view from above showing the same links in the position obtaining when the conveyor band has a curved shape.
Figure 4:
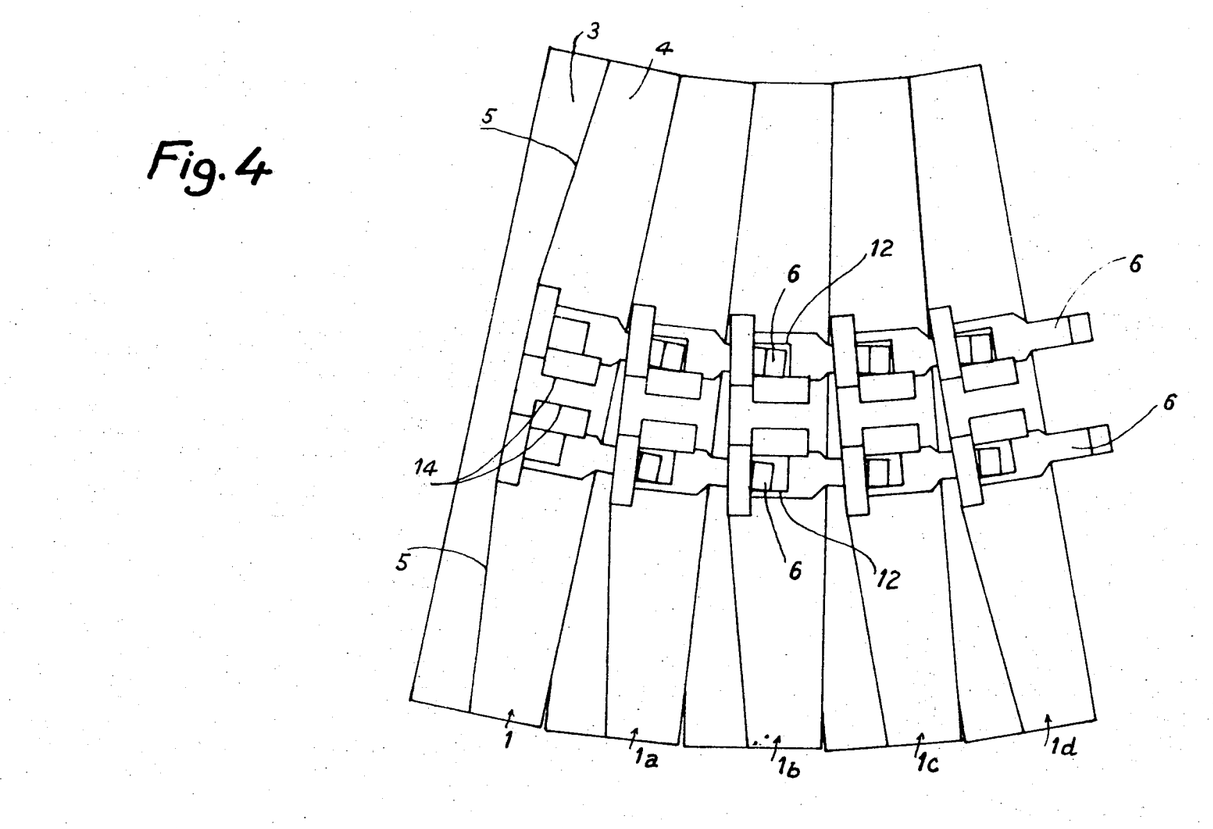
FIG. 4 is a perspective plane view from beneath.

It may also be pointed out that the step or shoulder 5 formed between the front portion 3 and rear portion 4 of each link extends along a broken line forming an angle lying substantially on the longitudinal axis of the conveyor chain or band to be formed. As will be made clear presently, this structure permits the relatively ample relative angular pivoting movement of the various interconnected links in a same horizontal plane so that the conveyor chain or band can follow a curved path, as illustrated in FIGS. 3 and 4.

According to an essential feature characterising the present invention, the assembling means provided on each link comprise, adjacent the rear edge of each link, a pair of coupling lugs 6 projecting beyond this edge and extending on either side of the longitudinal axis X-Y of the conveyor band and parallel thereto. The ends of these coupling lugs 6 are simply curved to form about one-fourth of a circle, their end portions lying substantially at right angles to the general plate of the corresponding link.

However, the assembling means according to this invention further comprise, adjacent the rear edge of each link a pair of retaining straps 7 extending transversely on either side of the longitudinal axis X-Y of the conveyor band. In this respect, it may be noted that these straps form a closed loop. In fact, each strap comprises a pair of side arms rigid with the lower face of the corresponding link and a bridge portion 8 interconnecting the arms.

The dimensions of the openings 9 of straps 7 are substantially complementary to the lugs 6 such that the coupling lugs 6 of another link can be engaged into them with a certain clearance. Moreover, the inner face of the bridge portion 8 of each strap 7 has a cylindrical shape having the same radius of curvature as the lugs 6 to permit the smooth pivotal movement of these lugs inside the straps.

Figure 8:
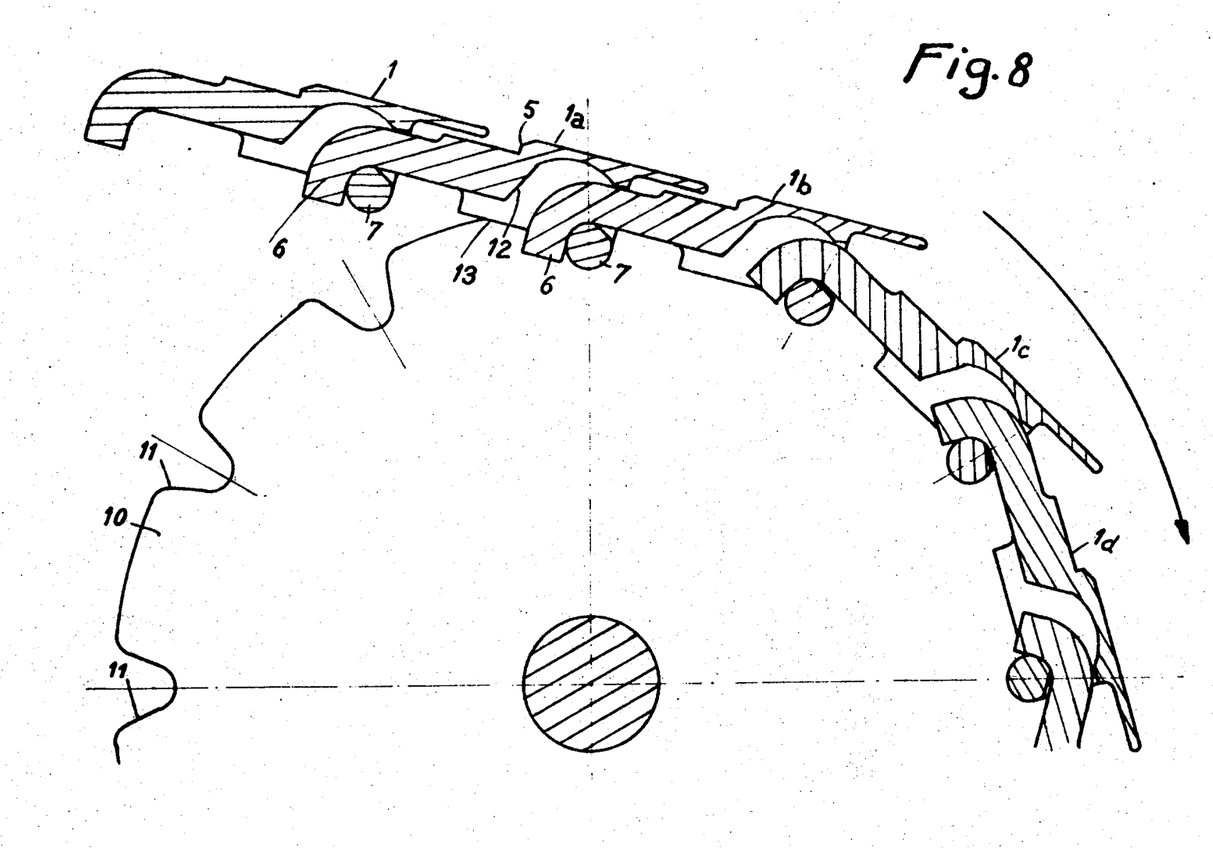
FIG. 8 is a fragmentary longitudinal section showing a conveyor band comprising the links of this invention during the passage thereof over a driving sprocket or drum.

However, another function of this bridge portion 8 of each strap 7 is to act as a driving tenon during the passage of the conveyor chain over a rotary sprocket or drum, such as the drum 10, illustrated in FIG. 8, and formed along its outer peripheral surface with spaced notches 11 adapted to recieve the tenons projecting from the lower faces of the links. Under these conditions the bridge portion 8 of each strap 7 may advantageously have a cylindrical configuration throughout its surface.

When two successive links are assembled together, the coupling lugs 6 of one link engage the corresponding straps 7 of the other link from underneath and fit with a relatively ample clearance in cavities 12 formed to this end in bosses 13 provided on the lower faces of the links.

Each boss 13 is rigid with one of the pair of straps 7 and with one of the coupling lugs 6 of the corresponding link, and this assembly is an integral part of the link since it is produced by molding.

However, it will be seen that the ends of the coupling lugs 6 engage with a certain clearance the aforementioned cavities 12 in the transverse direction and somewhat more in the longitudinal direction, thus affording various degrees of freedom of movement as will be explained presently.

On the other hand, the two bosses 13 thus formed under each link carry lateral registering lugs 14 adapted to act as shoes by slidably engaging guide rails or the like (not shown).

Figure 7:
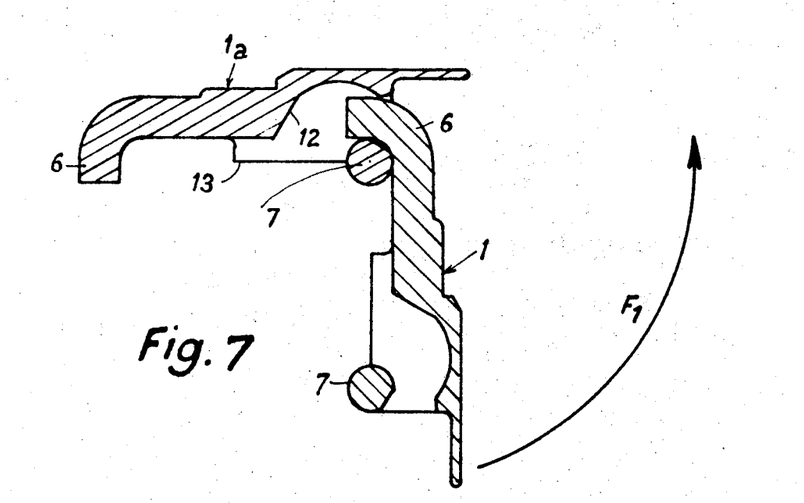
FIG. 7 is a longitudinal section showing the step of assembling two adjacent links in a chain according to this invention.

To assemble two adjacent or successive links, the leading link 1 is disposed substantially at right angles to the next link 1a so that the ends of its rear coupling lugs 6 can easily be inserted into the pair of front straps 7 of link 1a, as shown in FIG. 7. Then it is only necessary to impart a pivotal movement to the front or leading link 1, in the direction of the arrow $F_1$, so as to set it in coplanar relationship to the trailing link 1a. Under these conditions, the curved or bent ends of lugs 6 lie beyond the retaining straps 7 of link 1a within the cavities 12.

From the foregoing it is clear that the two links 1 and 1a are safely interconnected and cannot be uncoupled inadvertently, for the relative movements likely to take place between these links cannot under any circumstance reach an angular amplitude of 90°, which is required for releasing the lugs 6 from the straps 7.

As will be seen, the assembling of two adjacent or successive links can be obtained by means of a simple and single pivoting movement, in contrast with most prior art devices in which complex movements have to be impressed to the various links for coupling or uncoupling, such obviously causing a consequent loss of time. Besides, with the links of the present invention, the links can be disengaged or uncoupled by simply rotating one link through 90° for releasing the coupling lugs 6 of one link from the straps 7 of the adjacent link.

This easy coupling and uncoupling feature of the links according to the present invention constitutes an essential advantage of this novel structure. In fact, considering the fact that these links are intended for assembling conveyor chains or bands, the possibility of disassembling the links rapidly and without difficulty, for example, for cleaning or maintenance purposes or replacing certain links, is a most desirable requirement perfectly met by the present invention.

Another valuable feature characterising the links of the present invention lies in the great sturdiness of their assembling means. This sturdiness is due to the fact that the curved coupling lugs engage fully closed or loop-forming straps, in contrast with hitherto known devices of this type.

On the other hand, the shape and relative arrangement of the assembling elements provided in and formed integrally with these links, permit the mass production of the links by molding, under very satisfactory conditions, for the thickness of the various portions of these elements is substantially uniform. This accounts for a nearly complete absence of defects in the molded material.

Figure 5:
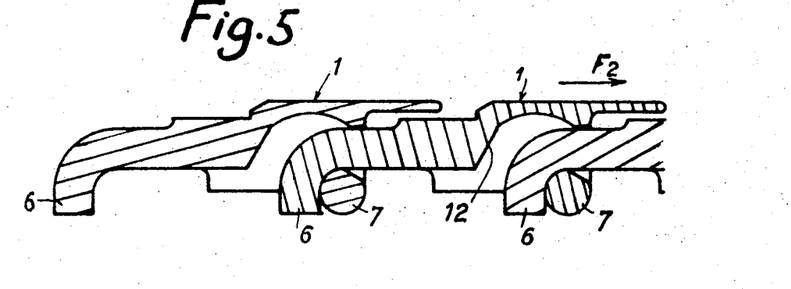
FIGS. 5 and 6 are longitudinal sections showing several successive links when the conveyor band incorporating these links is driven by traction and when it is driven by pushing, respectively.
Figure 6:
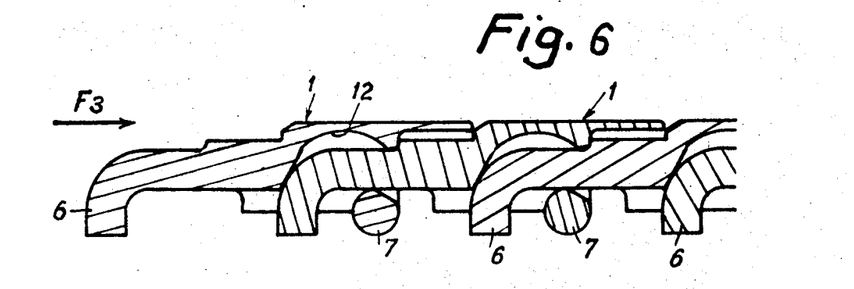

In addition, as already pointed out in the foregoing, the assembling elements thus contemplated, impart to the links the various freedoms of movement necessary for their use in the construction of conveyor bands or chains by means of these links. In this respect, the following remarks may be made:

1. The links have a certain freedom of movement in the longitudinal direction, since they can occupy two different relative end positions, namely a position corresponding to a maximum pitch, as shown in FIG. 5, and a minimum pitch position illustrated in FIG. 6. These two positions are due to the fact that the corresponding section of the conveyor band may be either pulled forwards as shown by the arrow $F_2$ (FIG. 5), or on the contrary pushed in the direction of the arrow $F_3$ (FIG. 6). In the first case the bent coupling lugs 6 of each link carry along by traction the next link behind. In the second case it is the bottom of each cavity 12 formed under each link that exerts a forward pushing effort against the coupling lugs 6 of the next link ahead.

2. As already mentioned hereinabove and as clearly apparent in FIGS. 3 and 4 of the drawings, the links according to the present invention are also adapted to move with a certain degree of freedom in the general plane of the conveyor band to permit the changes of direction or inflexion of this band in one or the other direction. This "fan-like" freedom of movement is made possible by the broken-line shape of the step or shoulder 5 dividing the front portion 3 from the rear portion 4 of each link.

3. Finally, the links are also adapted to pivot in relation to one another in a plane perpendicular to the general plane of the conveyor band, also in either direction. In fact, as illustrated in FIG. 8, the conveyor band can be curved downwards, for example, when passing over a driving drum or sprocket, or in case of change in the direction of the conveyor path.

However, this conveyor may also assume an upward curvature, whether the links have their maximum pitch or their minimum pitch.

4. Of course, some of these various freedoms of movement may be combined into swivel movements. Under these conditions, the conveyor band constructed from links according to the present invention may follow relatively complex or sinuous paths, in contrast to the conventional structures proposed heretofore in this specific domain, which comprise mostly and essentially an endless belt. Besides, in the case of conveyors constructed by using the links of this invention, it is possible to contemplate an upward or downward spiral path, a shape definitely precluded when utilizing conveyor elements of conventional types.

Of course, the present invention is concerned not only with the above-described links but also with complete conveyor bands constructed by using these links. These conveyor band may be used for constructing conveyors intended for transporting miscellaneous articles, products and objects.

Thus, these conveyors may be used for transporting items such as:

self-service trays, or any other trays, with or without dishes for consumption purposes, clean or dirty dishes, etc., containers for clean or dirty dishes, meal transport trays for hospitals, communities, canteens, etc., loose dishes, all containers for transporting consumable meals and food.

Of course, the links according to this invention as well as the conveyor band constructed by using these links should not be construed as being strictly limited to the above-described example, since various modifications and variations may be brought thereto without departing from the basic principles of the invention.

In a modified form of embodiment, the links may comprise lateral ledges adapted to retain the articles to be transported. The shape of these ledges may vary as a function of the dimensions and specific nature of these articles.

In another modified form of embodiment, one of the links of the corresponding conveyor band may comprise a stop element adapted to retain and position the object to be transported. Obviously the same conveyor band may comprise a plurality of links provided with a stop element of this character, the various stop elements being disposed at proper intervals along the band or chain. Of course, the shape of these elements may vary as a function of the specific nature of the articles or objects to be transported.

But, again, many other modifications may be contemplated without departing from the original features characterising this invention as set forth in the appended claims.

I claim:

1. Conveyor link having substantially the shape of a plate and adapted to be assembled with other identical links disposed in succession for constituting a conveyor band, said link comprising complementary assembling and hinge means comprising a pair of curved coupling lugs each secured to the bottom of said plate and spaced laterally apart to each other, each having a portion projecting beyond one edge of the plate, parallel to the longitudinal axis of the conveyor band to be obtained, each of said portions being curved in substantially L shape and having a free end portion disposed vertically downwardly relative to said plate, and disposed on opposite sides of said axis, respectively, and a pair of laterally spaced retaining straps in the form of closed loops extending transversely to said axis, and each secured to, and beneath said plate, adjacent its opposite edge, said loops of said straps being substantially complementary to, and adapted to receive said coupling lugs of another adjacent identical of said link.

2. The conveyor link as set forth in claim 1, wherein said assembling and hinge means adjacent said retaining straps defining cavities, adapted to receive the end of said coupling lugs of said another adjacent link, the relative dimensions of said lugs, closed loops, and cavities such that a certain clearance is given to said lug in both transverse and longitudinal directions, thus permitting various freedoms of movement between any pair of assembled and adjacent links in said conveyor band.

3. The conveyor link, as set forth in claim 2, wherein each of said retaining straps includes a bridge portion which comprises at least partially a cylindrical shape, said curved coupling lugs having a curved surface of the same radius as that of said cylindrical shape to permit pivotal movements of corresponding coupled of said coupling lugs and retaining straps.

4. The conveyor link, as set forth in claim 3, wherein said bridge portion of each of said retaining straps is also adapted to act as a coupling tenon engageable into one of notches of a rotary driving sprocket or drum of a conveyor composed of said links.

5. The conveyor link, as set forth in claim 2, further comprising a pair of bosses, said cavities adapted to receive the ends of said coupling lugs are formed in said pair of bosses, the latter projecting from the lower face of said plate, and lateral registering lugs means carried by said bosses and for sliding along a guide means, respectively.

6. A conveyor band for a conveyor structure, comprising hingedly interconnected of said links as set forth in claim 4.

7. A conveyor band for a conveyor structure, comprising hingedly interconnected links as set forth in claim 5.

* * * * *

UNITED STATES PATENT OFFICE
CERTIFICATE OF CORRECTION

Patent No. 3,807,548  Dated April 30, 1974

Inventor(s) Maurice Bergeron

It is certified that error appears in the above-identified patent and that said Letters Patent are hereby corrected as shown below:

On the cover sheet [73] Assignee: "Compagnie Europrenne de Manutention" should read -- Compagnie Europeenne De Manutention --; insert -- [30] Foreign Application Priority Data   Sept. 24, 1972   France-----7200114   --.

Signed and sealed this 10th day of September 1974.

(SEAL)
Attest:

McCOY M. GIBSON, JR.
Attesting Officer

C. MARSHALL DANN
Commissioner of Patents

UNITED STATES PATENT OFFICE
CERTIFICATE OF CORRECTION

Patent No. 3,807,548　　　　　　　　　　Dated　　April 30, 1974

Inventor(s)　　　Maurice Bergeron

It is certified that error appears in the above-identified patent and that said Letters Patent are hereby corrected as shown below:

On the cover sheet [73] Assignee: "Compagnie Europrenne de Manutention" should read -- Compagnie Europeenne De Manutention --; insert -- [30] Foreign Application Priority Data　　Jan. 4, 197　　France------------7200114 --.

This certificate supersedes Certificate of Correction issued Sept. 10, 1974.

Signed and sealed this 3rd day of December 1974.

(SEAL)
Attest:

McCOY M. GIBSON JR.　　　　　　　　C. MARSHALL DANN
Attesting Officer　　　　　　　　　Commissioner of Patents